UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

BINDING AND ADHESIVE SUBSTANCE, TANNING AGENT, AND THE LIKE.

1,311,219. Specification of Letters Patent. Patented July 29, 1919.

No Drawing. Application filed May 12, 1917. Serial No. 168,275.

*To all whom it may concern:*

Be it known that I, CARLETON ELLIS, a citizen of the United States, and a resident of Montclair, in the county of Essex and State of New Jersey, have invented certain new and useful Improvements in Binding and Adhesive Substances, Tanning Agents, and the like, of which the following is a specification.

This invention relates to a binding agent and is concerned especially with sulfite cellulose waste liquor material. The present application is in part a continuation of my co-pending applications Serial No. 735,393, Patent No. 1,068,048, and Serial No. 757,301, filed March 28, 1913, now Patent 1,246,805.

My invention specifically relates to a solution prepared from sulfite cellulose waste liquor by evaporation of the crude liquor to a solid state and subsequent re-solution of the solids obtained in water. Evaporation is carried on during the first stage in such a manner as to produce the solids in the form of a powder or granular fragmentary material, etc., in such physical or chemical condition as to be readily soluble in water or aqueous media, so that the binding agent may be dissolved in water to make a solution of the desired density or viscosity.

Sulfite cellulose waste liquor although a fairly stable body when concentrated to yield a substantially neutral syrup of about 30° B. is however, after drying to a solid material, such as a powder, likely to undergo undesirable changes which render it insoluble or prone to become insoluble in storage.

My invention is particularly directed to the production of a solution of sulfite cellulose waste liquor which does not have the disadvantages of the crude raw solution and which is free from certain disadvantages of the liquor obtained by mere concentration up to a certain density.

In preparing the solution I may, for example, take crude sulfite cellulose waste liquor preferably in its natural (acid) condition, as it leaves the digester or blowpit, and concentrate it by evaporation after largely freeing it from such content of lime or other material or solid bodies which tend to clog the concentrating apparatus. By this I do not mean that I ordinarily entirely remove all mineral bases which are present but preferably I endeavor to eliminate such proportion as may be precipitated to an undesirable extent during the concentration.

The liquor is preferably evaporated in an acid condition or in a "semi-acid" condition, that is, the normal acidity may be reduced about one-half by the addition of lime or other neutralizing agent. The preliminary concentration of the solution may be carried out with the fully acid material and if desired the semi-acid material may be subsequently prepared but it is preferable to carry out the concentration with a semi-acid material.

Instead of stopping the concentration with a syrupy body of say 30° B. which is about the strength of the product now on the market I carry the concentration much further removing preferably almost the entire content of water or at any rate sufficient to produce a dry product. This may be in the form of a granular or fragmentary but preferably pulverulent material and is readily soluble in water although it is not necessary to prepare it in such a form as to be excessively soluble like ordinary sulfite liquor.

The product may be employed as a binder for making briquets of coal, iron ore and the like, as a core compound, as a binder and dust layer for road beds and road surfaces and as a tanning agent, etc.

The solution prepared by concentrating and evaporating the sulfite cellulose waste liquor to dryness or substantial dryness and then dissolving the desiccated material in water is advantageous for use in many ways. One feature about the preferred product is that the solution appears to show a penetration and ease of admixture in many cases which does not obtain with the ordinary concentrated syrup under like conditions, especially when working with solutions of a fairly high concentration. Possibly this relative quality is traceable to the colloidal condition of the ordinary concentrated syrup which gives it a factitious body, destroyed or modified on evaporation to dryness. In fact, in a preferred form, the solid obtained by concentration gives a solution of diminished viscosity of 10% or more (10%–50%) as compared with ordinary sulfite cellulose waste liquor of approximately equal density, hence briquets or other products prepared from the solution of the dried substances tend to show less shrinkage, fewer hair lines or cracks and greater resistance to atmospheric or mechanical erosion. These important results are achieved by the simple procedure of evaporation of the sulfite cellulose waste liquor to a solid state preferably in an acid or semi acid state as noted above, and resolution of the dried product in water or aqueous media to yield the binding agent hereof, and my invention broadly covers a sufficient concentration and desiccation of sulfite cellulose waste liquor to yield dried solids and in the subsequent solution of the desiccated material to yield a binding solution comprising water and the dried solids of sulfite cellulose waste liquor dissolved therein and in a more specific aspect the invention involves the presence in solution of an acid sulfite cellulose waste liquor, particularly one having its normal acidity reduced approximately one-half. Such a solution prepared from waste liquor solids of a partially neutralized character in the powdered form is especially advantageous. Conversion of the solids of sulfite cellulose waste liquor to a powdered form especially by atomization gives a solution of good clarity and pronounced binding power well suited for making cores in foundry operations. Such a solution prepared by dissolving atomized desiccated sulfite cellulose waste liquor solids of an acid character (preferably partially neutralized) to give a stock product or basis of good strength, as for example, one of the strength (percentage of solids) of ordinary concentrated waste liquor in syrupy form, of say 20–30° B. is far preferable for many uses in the arts, in comparison with many forms of binders heretofore used.

In Serial No. 757,301 I have stated that sulfite cellulose waste liquor may be dried to a solid and ground to a powder or dried in an atomizing system which yields the material in a pulverulent condition. In such a mode of operation, I may first concentrate the liquor somewhat, say, to 30° Bé., (during which operation the dissolved $SO_2$ is liberated and removed. This may be done in a vacuum evaporator, if desired. The liquor may then be partially neutralized, e. g., by the addition of enough lime to neutralize about half of its acidity. The liquor may then be filtered, or the insoluble matter may be allowed to settle and the clear liquor drawn off. The liquor, which may still be near the boiling point, can then be atomized with hot gases (e. g. by hot chimney gases as described and claimed in my copending application 188,360 filed September 12, 1917.) Such a desiccated product may thus be made and at the time of use can be dissolved in water to form a concentrated or dilute solution of the sulfite cellulose waste liquor solids which may be used as a binding adhesive or tanning agent. As I have stated in the last mentioned patent application, briquets of various types may be made with the sulfite liquor binder material, bulking material such as coal dust or fines, culm, sawdust, mineral fillers, talc, magnesite, crushed rock, sand, fiber, asbestos, iron ore, etc., being used if desired. From 6 to 10% of sulfite liquor may be used in briqueting, for example, coal, the character of the coal and other conditions of operation somewhat changing the proportion as required. Lime may be used to precipitate or coagulate the sulfite cellulose waste liquor solids which is aided and accelerated by heating.

Finally it may be stated that the product made by first reducing the sulfite cellulose waste liquor to a dry state and then dissolving the dried solids in water, or other aqueous media, affords a new binding agent possessing novel qualities and capable of greater and more widespread use in individual operations than has been possible heretofore with other forms of binding material of related character.

What I claim is:—

1. A binding medium consisting of an aqueous solution of the dried solids of partially, but not substantially completely neutralized sulfite cellulose waste liquor.

2. A binding medium comprising an aqueous solution of the dried substantially acid solids of sulfite cellulose waste liquor.

3. A binding medium consisting of an aqueous solution of the dried atomized solids of sulfite cellulose waste liquor, said solution having an acidity materially less than that of the original liquor, but materially greater than zero.

4. An acid solution adapted for use as a binding medium comprising desiccated sulfite cellulose waste liquor solids in a solvent medium.

5. An acid binding agent comprising the desiccated solids of sulfite cellulose waste liquor dissolved in water, said composition being characterized by having a viscosity of at least 10% less than ordinary concentrated sulfite cellulose waste liquor of like density.

6. A binding agent comprising the desiccated solids of sulfite cellulose waste liquor dissolved in water, said composition being characterized by having a viscosity of from 10 to 50% less than ordinary sulfite cellulose waste liquor of like density, said solution having a material fraction only of the acidity of the raw liquor.

7. A binding agent comprising the desiccated acid solids of sulfite cellulose waste liquor dissolved in water, said composition being characterized by having a viscosity of at least 10% less than ordinary sulfite cellulose waste liquors of like density.

8. A binding agent comprising the dried desiccated solids of approximately one-half neutralized sulfite cellulose waste liquor, dissolved in water, said composition being characterized by yielding fuel briquets substantially free from hair cracks.

9. A solution for use in the arts as a binder, tanning agent and the like which comprises a solution of desiccated acid solids of sulfite cellulose waste liquor.

10. A binder for cores comprising a solution in water of atomized desiccated sulfite cellulose waste liquor solids of acid reaction.

11. A composition comprising a strong solution of atomized desiccated sulfite cellulose waste liquor solids of an acid character.

12. As a binding agent, a solution of atomized and dried substantially acid solids of sulfite waste liquor.

CARLETON ELLIS.